United States Patent [19]

DiNardo

[11] Patent Number: 4,514,534

[45] Date of Patent: Apr. 30, 1985

[54] MODIFIED POLYPROPYLENE FOR FILM

[75] Inventor: Victor M. DiNardo, Monroeville, Pa.

[73] Assignee: United States Steel Corporation, Pittsburgh, Pa.

[21] Appl. No.: 599,880

[22] Filed: Apr. 13, 1984

[51] Int. Cl.$^3$ .............................. C08K 5/05; C08K 5/15
[52] U.S. Cl. ..................................... 524/108; 524/384; 524/528
[58] Field of Search ......................... 524/384, 528, 108

[56] References Cited

U.S. PATENT DOCUMENTS

| | | | |
|---|---|---|---|
| 4,016,118 | 4/1977 | Hamada et al. | 523/100 |
| 4,314,039 | 2/1982 | Kawai et al. | 524/108 |
| 4,338,228 | 7/1982 | Inoue et al. | 524/384 |
| 4,359,544 | 11/1982 | Hwo et al. | 524/232 |
| 4,371,645 | 2/1983 | Mahaffey, Jr. | 524/58 |
| 4,388,119 | 6/1983 | Uchiyama | 524/108 |
| 4,410,649 | 10/1983 | Cieloszyk | 524/108 |
| 4,434,264 | 2/1984 | Ficker | 524/528 |
| 4,439,567 | 3/1984 | Inoue et al. | 524/108 |

OTHER PUBLICATIONS

*Milliken Chemicals*–"Milliken's Clarifying Agent for Polypropylene–Millad 3905 Cleared by FDA".
Chem. Abstracts 99:213492t by Mitsubishi.
38–Plastics Fabr., Uses vol. 99, 1983-99:196282e by Sumitomo.

*Primary Examiner*—Joseph L. Schofer
*Assistant Examiner*—N. Sarofim
*Attorney, Agent, or Firm*—William L. Krayer

[57] ABSTRACT

An improved polypropylene blend for biaxial orientation into thin films is made by combining low molecular weight polypropylene, a peroxide agent, a nucleating agent, and linear low density polyethylene in a pelletizing extruder.

14 Claims, No Drawings

MODIFIED POLYPROPYLENE FOR FILM

BACKGROUND OF THE INVENTION

This invention relates to polypropylene, particularly to polypropylene modified to produce biaxially oriented film for the packaging market. Biaxial orientation is well known in the industry and is used to enhance both the optical and physical properties of the polymer film. Contemporary commercial technology for specialty film involves composite structures that can contain as many as 5 to 7 different coextruded polymeric components. Coextrusion with polymers other than polypropylene is used to improve or impart special properties to the polypropylene such as impermeability or sealability.

To maintain compatibility and clarity of the composite, polypropylene must be used which is known to have a low haze property. Historically, high clarity polypropylene is obtained by modifying the polymer microstructure; the addition of a suitable nucleating agent (i.e. sodium benzoate) to the polymer during pelletizing is known to alter crystalline structure (spherulite growth) and enhance clarity. This improved clarity, however, can be at the expense of good processability and non-uniform properties in the film. For example, optical or mechanical defects such as tearing of the film during drawing can be caused by inhomogeneities (i.e. large particle size distributions) related to the presence of nucleating agents or other inorganic additives.

My invention provides for the production of a film grade polypropylene that is nucleated, easy to process, has exceptional multi-directional physical properties, and exhibits a low measure of haze. Such a combination of properties has been extremely difficult to achieve in the past.

Prior to the present invention, it has been known that bis(alkylbenzylidene) sorbitols could be used as clarifying agents, i.e. to reduce haze, in polyolefins. See the sales sheet for "Millad 3905" attached to the Prior Art Statement filed herewith; also see abstracts of the Japanese Patent application No. 81/186,663, Nov. 19, 1981; application No. 81/166,675, Oct. 19, 1981, and U.S. patent application No. 363,824, Mar. 31, 1982, now abandoned.

It is also known in the art that so-called "controlled rheology" (CR) in polypropylene can be attained by the closely regulated addition of certain peroxides such as 2,5-dimethyl-2,5 di(t-butylperoxy) hexane. The peroxide typically is added in the extruder during pelletization (after the polymerization process is complete). The peroxide will tend to encourage a more or less uniform breakdown of the molecular structure of the polypropylene under the physical and thermal stress of the extruder, resulting in a product having a relatively narrow molecular weight distribution; the reduction in average molecular weight and the improved narrowness of the molecular weight distribution are typically accompanied by an increase in melt flow and a change in both rheology and physical properties compared to those of a reactor product have a similar melt flow. This "cracking" technique is well known in melt spinning fibers and more recently has become accepted in high-speed injection molding; however, film made from low melt flow peroxide-cracked material is "flexible" and has a high percent haze, two undesirable properties for polypropylene films.

It has also been suggested in the prior art that so-called linear low density polyethylene may be used to make films. Linear low density polyethylene (LLDPE) is polyethylene containing a small amount (typically 0.5%) mono olefin co-monomer such as 1-hexene, 1-butene, or 1-octene and generally having a relatively narrow molecular weight distribution and short chain branching. See, for example, U.S. Pat. No. 4,362,835. It is indicated in German Pat. No. 1,902,573 that the incorporation of polyethylene (homopolymer) may have an effect on the crystallization rates of polypropylene.

The reader may be interested also in U.S. Pat. Nos. 4,359,544; 4,282,076 and 4,296,022 for general background in the area of nucleation and controlled rheology.

SUMMARY OF THE INVENTION

The composition of my invention comprises a polypropylene homopolymer having a low melt-flow (e.g. about 2.0 to about 5.0) including about 750 to about 1500 ppm of more or less conventional stabilizers, such as BHT, calcium stearate, Irganox 1010, and Kenemide E, about 1000 ppm to about 2500 ppm of a substituted sorbitol nucleating agent, (specifically Millad 3905) and about 0.25% to about 2.0% linear low density polyethylene (polyethylene including about 0.5% to about 1.0% mono olefin monomers having from 4 to 8 carbon atoms) having a melt flow of about 1.0 to about 2.5 (condition E). The substituted sorbitol is a bis(alkylbenzylidene) sorbitol wherein the alkyl groups have about 2 to about 18 carbon atoms. The low melt-flow polypropylene may be created in an extruder from a lower melt-flow propylene homopolymer by adding thereto prior to or during the extrusion process about 100 ppm to about 250 ppm of a dialkyl peroxide "controlled rheology" additive such as Lupersol 101.

Several analytical comparisons (Table I) have been made which illustrate the advantages of my invention. In Table I, PP-A is a fractional melt flow (0.70, condition L) reactor-made homopolymer. This material is the "base" or "starter" resin which, as used in columns II, III and IV of Table I is peroxide cracked to the final product.

TABLE I

Analytical Results - Nucleated CR Polypropylene Containing LLDPE

| | I<br>PP-A | II<br>PP-A + 120<br>ppm Peroxide | III<br>PP-A + 120 ppm<br>Peroxide +<br>Additives* | IV<br>PP-A + 120 ppm<br>Peroxide + Additive + 1.0% LLDPE | V<br>UC<br>GRSN-7047<br>LLDPE |
|---|---|---|---|---|---|
| DSC | | | | | |
| Tm, °C. | 159.0 | 158.3 | 160.8 | 160.1 | 120.9 |
| Crystallinity, % | 42.7 | 46.8 | 45.6 | 48.9 | 48.3 |
| Cryst Temp, °C. | 109.6 | 111.6 | 120.6* | *121.0 | 104.6 |
| Cryst Rate, mw/min/mg | 0.037 | 0.131 | 3.094 | 4.830 | None at 125,100 |
| Cryst Time, min | 13.3 | 8.6 | 2.7 | 2.6 | 90, 80° C. |
| GPC | | | | | |

TABLE I-continued

Analytical Results - Nucleated CR Polypropylene Containing LLDPE

|  | I<br>PP-A | II<br>PP-A + 120<br>ppm Peroxide | III<br>PP-A + 120 ppm<br>Peroxide +<br>Additives* | IV<br>PP-A + 120 ppm<br>Peroxide + Additive + 1.0% LLDPE | V<br>UC<br>GRSN-7047<br>LLDPE |
|---|---|---|---|---|---|
| $\overline{M_w}$ | 439,900 | 341,500 | 350,200 | 339,500 | 195,100** |
| $\overline{M_n}$ | 72,200 | 69,200 | 72,800 | 69,200 | 48,200 |
| Z | 1,543,100 | 1,016,000 | 982,000 | 963,500 | 572,500 |
| $\overline{M_w}/\overline{M_n}$ | 6.1 ⟶ | 4.9 | 4.8 | 4.9 | 4.1 |
| ($\eta$) | 2.4 | 2.0 | 2.1 | 2.0 | 1.4 |
| Melt Flow, L | 0.7 | 1.9* | 2.1 | 2.2 | 1.7* |
| % Haze |  |  |  |  |  |
| (50 mil C.M.) | 46.1 | 57.5 | 47.5 | 42.5 | 94.0 |
| (50 mil I.M.) | 34.9 | 55.2 | 35.3 | 36.8 | — |
| (2 mil C.F.) | 8.5 | 30.5 | 5.7 | 6.8 | — |

*Additives: Irganox 1010, 0.25% Millad 3905.
**Not corrected for PE.
NOTE:
CM - Compression Molded
IM - Injection Molded
CF - Cast Film Referring to Table I, it can be seen that the addition of peroxide to the base resin (fractional melt flow homopolymer) both narrows the molecular weight distribution and increases the percent haze of injection molded, compression molded and cast film samples (blends I and II). Addition of a nucleating agent (blend III) increases the crystallization temperature from approximately 110° C. to 120° C. and decreases the haze to that of the "starter" material, PP-A. The subject blend of this invention, blend IV, shows the addition of 1.0% LLDPE. In the absence of a nucleating agent, the LLDPE (column V) is considered "incompatible" with the CR ("controlled rheology") polypropylene; however, in the nucleated CR-polypropylene, (column IV), the melting point (Tm) of the LLDPE occurs at the crystallization temperature (Tc) of the polypropylene. This thermal balance, [(Tm)LLDPE=(Tc)PP=120° C.], and the concurrent crystallization of polyethylene and polypropylene may contribute to low haze and improved physical properties attainable only through the combination of peroxide, nucleation, and addition of LLDPE. As a result, the subject blend may involve solid-liquid separation behavior, co-crystallization of the normally very slow crystal growth LLDPE and the fast growth polypropylene, or amorphous phase compatability between the two polymers. While accurate results are difficult to obtain with concentrations of LLDPE in polypropylene within the bounds of my invention, results with higher concentration of LLDPE indicate that the annealed differential scanning calorimetry curve will show an upward shift in crystallization temperature (Tc) of the LLDPE from about 105° C. to 115° C. This higher crystallization temperature "interferes" with the normal crystallization rate of the nucleated polypropylene. The LLDPE appears to crystallize concurrently with the polypropylene. As previously mentioned, the melting point of the LLDPE is at the crystallization temperature of the polypropylene.

FILM SAMPLES

The general trends in physical properties determined on 4-inch wide, 2 mil thick cast film from blends similar to those in Table I show the following resin-component interactions:

CONTROL RESIN: 4 melt-flow, homopolymer film grade resin.

| Interaction | Results |
|---|---|
| PP-A + Peroxide<br>(4 melt flow) | narrow molec. wt. distribution.<br>very high impact properties.<br>low tensile yield strength.<br>high percent haze.<br>film is too "flexible". |
| PP-A + Peroxide<br>+ LLDPE | incompatible blend.<br>very high percent haze.<br>large property imbalance<br>(longitudinal vs. transverse direction). |
| PP-A + Peroxide<br>+ Nucleation<br>(Millad 3905) | physical properties similar to a 4 melt-flow reactor product.<br>no apparent incentive to use this material. |
| PP-A + Peroxide<br>+ Nucleation<br>+ LLDPE | low haze product.<br>high yield strength.<br>very high ultimate elongations (10–15% greater than control).<br>exceptional bi-directional property balance. |

Some specific physical properties relative to film (Table II) confirm the general trends reported in Table I on resin-component interactions. Compared with a 4 melt-flow homopolymer made in a reactor (sample I), the 4 melt-flow CR product (sample II) has a lower tensile yield strength, a higher ultimate elongation and a high haze. Adding a nucleating agent (sample III) does not produce a material significantly different from the reactor product; however, the combination of the nucleating agent and LLDPE (blend IV) results in improved modulus, yield strength, elongation and haze.

Film is generally defined in the trade as being 10 mils or less in thickness; above 10 mils and up to about 0.05 in., the product is known as a sheet. My invention is useful for both biaxially oriented sheet and biaxially oriented film.

TABLE II

PHYSICAL PROPERTIES 4-in. wide film × 2.2 mil thick

|  | I<br>PP-B*** | II<br>(Control)<br>PP-A +<br>Peroxide | III<br>Control<br>+<br>Nucleation | IV<br>Control +<br>Nucleation<br>+ LLDPE |
|---|---|---|---|---|
| Tensile Modulus × 10⁵ PSI | | | | |
| MD* | 2.46 | 2.12 | 2.14 | 2.38 |
| TD** | 1.66 | 2.08 | 2.28 | 2.42 |
| Tensile Yield Strength, PSI | | | | |
| MD | 3800 | 3120 | 3900 | 4340 |
| TD | 3600 | 3060 | 3820 | 4160 |
| Ultimate Elong, % | | | | |
| MD | 534 | 600 | 680 | 675 |
| TD | 807 | 866 | 750 | 946 |
| Haze, % | 8.5 | 30.5 | 5.7 | 6.8 |

*Machine direction.
**Transverse direction.
***4-melt flow reactor homopolymer.

Additional data is presented on laboratory-prepared film extrusion cast onto a chill roll. Results in Table III show that the blend of my invention, 88-7U, exhibits an improvement in physical properties compared with a similar melt flow reactor-made homopolymer control resin. The new film, containing the nucleating agent (0.25% Millad 3905) and 1.5% LLDPE, has exceptional ultimate elongation in both the longitudinal direction (MD) and transverse direction (TD). Melt orientation of the blend (achieved by increasing roll speed 33%) results in film with a very high tensile modulus; other properties are similar to those of the control resin.

TABLE III

Tensile Properties of High-Clarity Film*
Extruded From Polypropylene 88-7U

|  | Tensile Modulus × 10⁵, psi | | Yield Strength, psi | | Yield Elongation, % | | Tensile Strength, psi | | Ultimate Elongation, % | |
|---|---|---|---|---|---|---|---|---|---|---|
|  | MD | TD | MD | TD | MD | TD | MD | TD | MD | TD |
| Control | | | | | | | | | | |
| PP-B | 2.47 | 1.66 | 3790 | 3620 | 13.2 | 12.5 | 4150 | 4080 | 534 | 807 |
| (SD)*** | 0.18 | 0.12 | 104 | 143 | 0.69 | 0.74 | 349 | 460 | 156 | 117 |
| COV, %+ | 7.2 | 7.8 | 2.7 | 4.0 | 5.3 | 5.9 | 8.4 | 11.3 | 34.7 | 14.4 |
| 88-7U | 2.88 | 1.88 | 4320 | 4020 | 13.2 | 12.4 | 4760 | 4410 | 763 | 920 |
| (SD) | 0.36 | 0.14 | 67.2 | 94 | 0.41 | 0.84 | 398 | 518 | 51 | 139 |
| COV, % | 12.6 | 7.7 | 1.6 | 2.3 | 3.1 | 6.8 | 8.4 | 11.7 | 6.7 | 15.1 |
| 88-7U** | | | | | | | | | | |
| MD Oriented | 5.88 | 2.28 | 3910 | 3830 | 15.7 | 13.8 | 4230 | 4150 | 589 | 798 |
| (SD) | 0.34 | 0.20 | 49.2 | 168 | 0.02 | 0.01 | 626 | 354 | 56.3 | 47.8 |
| COV, % | 5.9 | 9.0 | 1.3 | 4.3 | 0.1 | 0.1 | 14.8 | 8.4 | 9.6 | 6.0 |

*Chill-roll cast film (~2.0 mil thick by 3.75 in. wide) tested at 2.0 in./min CRS, 2.0 inch gage length. Film extrusion melt: 467° F., roll temperature 62° F.
**MD orientation achieved by increasing roll speed 33 percent.
***Standard Deviation.
+Coefficient of Variation.

Unlike the chill-roll cast film previoulsy reported, film in Table IV was made by water-quenching the extrudate. Blend 88-7 containing 1.5% LLDPE and 0.25% Millad 3905 has an excellent surface appearance, is approximately 9% less in film width, and has a low (8.8%) haze compared with a similar melt flow reactor-made homopolymer.

TABLE IV

Characteristics of Water-Quench Film from Nucleated CR/LLDPE

| Control Samples* | Haze Sample Thickness | Width | Appearance | % Haze |
|---|---|---|---|---|
| PP-C* | 1.5–2.0 | 5.625 | No orange peel<br>No wrinkles | 19.0 |
| PP-D** | 1.5–2.2 | 5.500 | Very fine orange peel (acceptable) wrinkles, one poor edge | 12.8 |
| 88-7 (invention)<br>(1.5 LLDPE 0.25 M-3905) | 1.5–2.0 | 5.094 | Excellent film<br>No orange peel<br>Clearer than F-040F | 8.8 |
| PP-E+ | 1.5 (OPP) | — | Excellent production quality, biaxial orientation | 0.65 |

*4-melt flow homopolymer, not cracked, not film grade.
**4-melt flow commercial film grade homopolymer.
+a 2.5 melt flow reactor film grade homopolymer, commercial biaxial oriented polypropylene film (OPP).

Physical properties on biaxially oriented film are shown in Table V. Compared to conventional homopolymer film, film made from the blend is easier to orient in the longitudinal direction (MD); orientation in the lateral direction (TD) can be done at lower temperatures and higher stretch ratios than commonly used for homopolymer.

INJECTION MOLDED SAMPLES

Tables VI and VII relate the Izod Impact Strength of the subject blend. Results show (Table VI) impact properties of the blend are greater than 1.0 ft-lb/in. notch and annealed samples have an impact strength greater than 12 ft-lb/in. notch with all partial sample breaks. Results in Table VII show the Izod Impact Strength is affected by the molding temperature. The impact strength ranges from 1.17 ft-lb/in.(N) at 450° F. to 4.40 ft-lb/in.(N) at 430° F. These properties are the result of molding orientation, the interaction between the peroxide with the two polymers (PP-LLDPE), and the nucleating agent. This type of behavior is not observed in conventional film-grade polypropylene.

TABLE V

**\*BIAXIAL ORIENTATION OF LOW MELT FLOW NUCLEATED CR CONTAINING 1.5 PERCENT LLDPE (1.0 mil Film)**

| Tensile Modulus × $10^5$ PSI | | Tensile Strength PSI | | Percent Elongation | |
|---|---|---|---|---|---|
| MD | TD | MD | TD | MD | TD |
| 3.3 | 6.1 | 19,540 | 29,240 | 83 | 39 |
| (0.19) | (0.25) | (1690) | (2610) | (11.6) | (9.7) |

*48 mil Sheet stretched 6:1 in Machine Direction (MD) at 290° F. and 8:1 in Transverse Direction (TD) at 330° F. to produce a 1.0 mil Film.
Standard Deviation (0.00)

TABLE VI

**Izod Impact Strength vs. Room Temperature Age Time for Blends 88-13 and 88-14\*\***

| | Izod Impact (ft-lb/in. notch) | Standard Deviation |
|---|---|---|
| 88-13 (1.5% LLDPE) | | |
| 24 hours | 1.28 | 0.03 |
| 48 hours | 1.27 | 0.03 |
| 72 hours | 1.24 | 0.02 |
| 144 hours | 1.24 | 0.05 |
| 144 hours (annealed)* | 12.8 (partial break) | 0.24 |
| 88-14 (0.5% LLDPE) | | |
| 24 hours | 1.25 | 0.02 |
| 48 hours | 1.23 | 0.02 |
| 72 hours | 1.19 | 0.02 |
| 144 hours | 1.20 | 0.04 |
| 144 hours (annealed)* | 12.5 (partial break) | 0.29 |

*Annealed @ 140° C. for 2 hours, slow-cooled to room temperature, notched, and tested.
\*\*\*88-13 and 88-14 are PP-A which has been "cracked" through the addition of a peroxide as in column IV of Table I, containing 1.5% and 0.5% LLDPE, respectively.

TABLE VII

Effect of Molding Temperature on the Izod Impact Strength of Low Melt-Flow Nucleated CR containing 1.5% LLDPE

| Injection Molding* Cylinder Temperature, °F. | 430 | 440 | 450 |
|---|---|---|---|
| Samples Tested/Izod Impact Strength, ft-lb/in (N) | 10/4.40 | 7/1.19 3/3.93 | 9/1.17 |
| Standard Deviation | 0.23 | 0.06 | 0.03 |

*Mold Temperature 140° F.

For example, Tensile-Impact data in Table VIII show the desirable effect of the additive combination. Unlike the Izod test, the Tensile Impact test measures energy to rupture by rapid stretching. It is a high speed test in which crack-failure is initiated and propagated in the absence of a notch. Because of material elongation, the test is sensitive to failure mechanisms different from those found in Izod or falling-weight impact testing. The effect of peroxide on the starter material (PP-A) is a property imbalance (composition II). A high percent haze is accompanied by a high impact strength in the flow-direction of the molded die-cut specimen and a drop in impact strength of the transverse-to-flow direction (TFD) sample. The nucleated CR blend (Millad 3905) has similar, or in some cases lower, properties than the control material (see blend III). An improvement in both FD (flow direction) and TFD strength is observed (blend IV) with the addition of both Millad and LLDPE to the CR material. The blend has a low percent haze, uncharacteristic of low-melt flow CR. In blend V, the Millad nucleating agent is omitted. The LLDPE results in a high percent haze and an imbalance in impact properties.

TABLE VIII

TENSILE IMPACT PROPERTIES OF MODIFIED POLYPROPYLENE\*

| | I PP-A | | II PP-A + 100 ppm Lupersol 101 | | III PP-A Nucleated CR (See Additives) | | IV PP-A Nucleated CR + 0.5% LLDPE | | V PP-A (Not Nucleated) CR + 0.5% LLDPE | |
|---|---|---|---|---|---|---|---|---|---|---|
| Melt Flow, (L) | 0.72 | | 1.9 | | 2.1 | | 1.9 | | 2.1 | |
| | FD | TFD | FD | TFD | FD | TFD | FD | TFD | FD | TFD |
| Tensile-Impact ft-lb/in² | 79.0 | 10.3 | 96.4 | 7.4 | 77.7 | 9.0 | 89.7 | 12.5 | 108.1 | 5.4 |
| | | | (Stress-whiten on failure) | | | | | | | |
| % Haze Compression Molded Plaque | 46.1 | | 54.3 | | 47.5 | | 42.3 | | 51.5 | |
| Additives | | | | | | | | | | |
| 500 ppm Irganox 1010 | | | | | | | | | | |
| 120 ppm Lupersol 101 | | | | | | | | | | |
| 0.25% Millad 3905 | | | | | | | | | | |

*ASTM D1822, Type-L Bars Die-Cut (Flow Direction/Transverse Flow Direction) from 50-mil Injection-Molded Plaques.

I claim:

1. A modified polypropylene useful for making film comprising propylene homopolymer having a melt flow of about 2.0 to about 5.0 g/10 min.(L) said propylene homopolymer formed by cracking a lower melt flow polypropylene using a peroxide agent selected from the group consisting of dialkyl peroxides in an amount of about 50 pm to about 300 ppm, about 0.10% to about 0.25% bis(alkylbenzylidene) sorbitol nucleating agent wherein the alkyl groups have about 2-18 carbon atoms, and about 0.25% to about 2.0% linear low density polyethylene having a melting point of about 120° C. and comprising ethylene copolymerized with about 0.5% to about 7% olefin monomers having about 4 to about 8 carbon atoms.

2. Biaxially oriented sheet made from the modified polypropylene of claim 1.

3. Biaxially oriented film made from the modified polypropylene of claim 1.

4. The modified polypropylene of claim 1 wherein the cracking takes place in an extruder.

5. Biaxially oriented sheet comprising (a) propylene homopolymer having a melt flow of about 2 to about 5, (b) about 0.1% to about 0.25% bis(alkylbenzylidene) sorbitol wherein the alkyl groups have about 2-18 carbon atoms, and (c) about 0.25% to about 2% copolymer of ethylene and about 0.5% to about 7% olefin monomers having about 4 to about 8 carbon atoms, the propylene homopolymer having a molecular weight distribution of about 2 to about 4 and the composition as a whole having a crystallization temperature of about 120° C.

6. Polypropylene useful for making film, made by the process comprising cracking a polypropylene having a melt flow lower than 5.0 g/10 min.(L) with a dialkyl peroxide in the presence of about 0.10% to about 0.25% sorbitol nucleating agent and about 0.25% to about 2.0% linear low density polyethylene comprising ethylene copolymerized with about 0.5% to about 7% olefin monomers having about 4 to about 8 carbon atoms, to effect an increase in the polypropylene crystallization temperature to coincide approximately with the melting point of the polyethylene.

7. Polypropylene of claim 6 wherein the cracking takes place in an extruder.

8. Polypropylene of claim 6 wherein the crystallization temperature of the polypropylene and the melting point of the linear low density polyethylene are both about 120° C.

9. Biaxially oriented sheet made from the polypropylene of claim 6.

10. Biaxially oriented sheet made from the polypropylene of claim 7.

11. Biaxially oriented sheet made from the polypropylene of claim 8.

12. Biaxially oriented film made from the polypropylene of claim 6.

13. Biaxially oriented film made from the polypropylene of claim 7.

14. Biaxially oriented film made from the polypropylene of claim 8.

* * * * *

UNITED STATES PATENT AND TRADEMARK OFFICE
CERTIFICATE OF CORRECTION

PATENT NO. : 4,514,534
DATED : April 30, 1985
INVENTOR(S) : Victor M. DiNardo

It is certified that error appears in the above-identified patent and that said Letters Patent is hereby corrected as shown below:

Column 2, line 39, change "1.0%" to -- 7.0% --.

Column 8, line 49, claim 1, "50 pm" should be -- 50 ppm --

Signed and Sealed this

Twenty-first Day of January 1986

[SEAL]

Attest:

DONALD J. QUIGG

Attesting Officer

Commissioner of Patents and Trademarks